No. 880,427. PATENTED FEB. 25, 1908.
W. THEDORF.
FOLDING UMBRELLA.
APPLICATION FILED MAY 18, 1907.
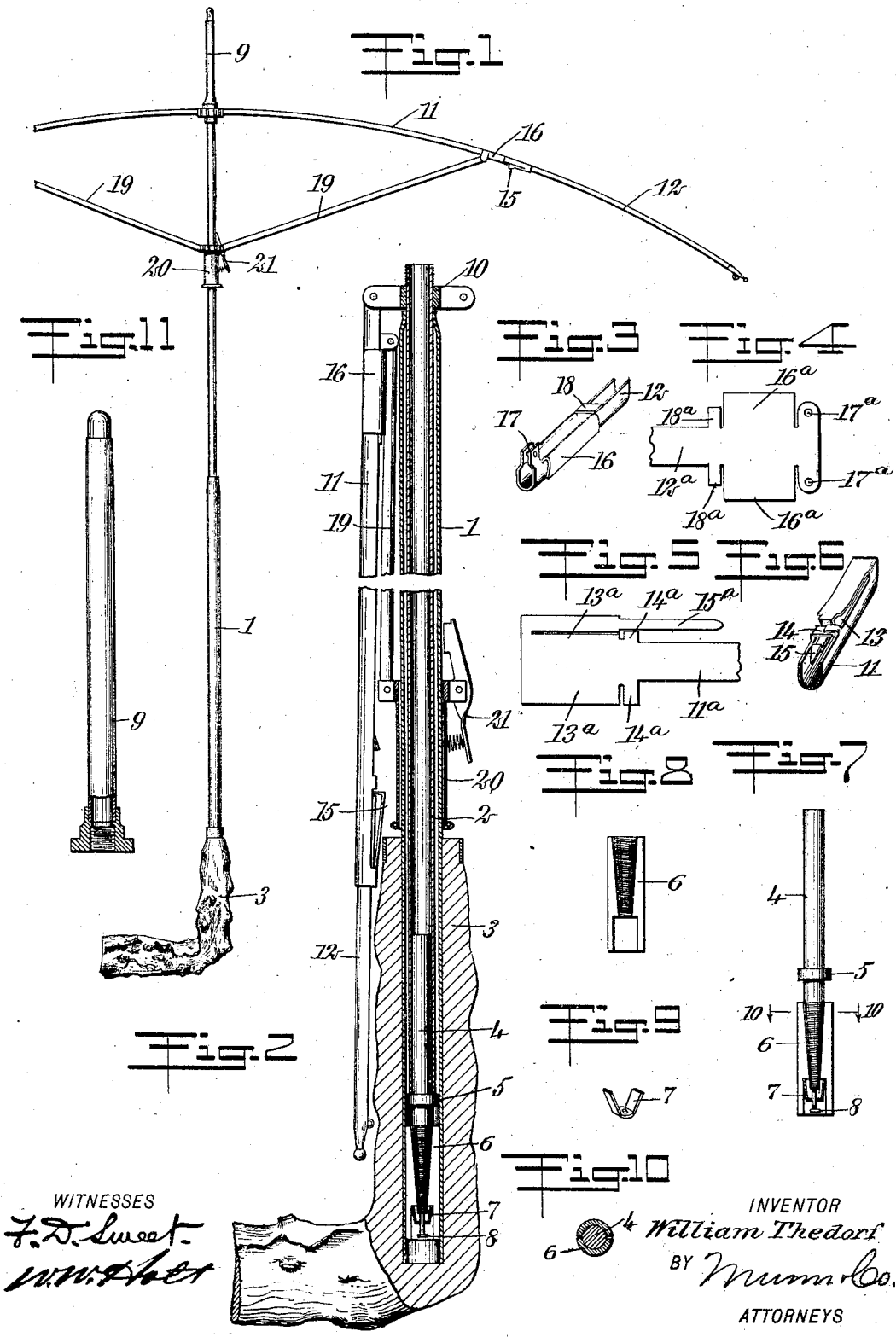
WITNESSES
INVENTOR
William Thedorf
BY
ATTORNEYS

UNITED STATES PATENT OFFICE.

WILLIAM THEDORF, OF ST. VINCENT, MINNESOTA.

FOLDING UMBRELLA.

No. 880,427.

Specification of Letters Patent.

Patented Feb. 25, 1908.

Application filed May 18, 1907. Serial No. 374,392.

*To all whom it may concern:*

Be it known that I, WILLIAM THEDORF, a citizen of the United States, and a resident of St. Vincent, in the county of Kittson and State of Minnesota, have invented a new and Improved Folding Umbrella, of which the following is a full, clear, and exact description.

This invention is an improvement in folding umbrellas, and its object is to provide a device of this nature constructed with a telescoping staff, the telescoping members of which are adapted to be positively retained in extended and contracted relations by a sectional nut carried by the inner member, this member also carrying the ribs of the umbrella, each of which is composed of two sections slidably connected together, with a spring catch for connecting the two sections of each rib when the umbrella is outstretched.

Reference is to be had to the accompanying drawings forming a part of this specification, in which similar characters of reference indicate corresponding parts in all the figures.

Figure 1 is a fragmentary view of the umbrella when outstretched; Fig. 2 is a view of the umbrella when folded, partly in central, vertical section; Fig. 3 is a perspective view of one end of one of the rib sections; Fig. 4 is a plan of a blank from which the rib section shown in Fig. 3 is made; Fig. 5 is a plan of a blank from which the rib section shown in Fig. 6 is made; Fig. 6 is a perspective view of one end of a rib section which is slidably connected to the rib section shown in Fig. 3; Fig. 7 is a view of a sectional nut and a pin in threaded engagement therewith, which is carried by the inner member of the staff only one-half of the nut being shown; Fig. 8 is an inner face view of one-half of the nut shown in Fig. 7, the spring clip which connects the two halves of the nut together being removed. Fig. 9 is a perspective view of the spring clip which connects the two halves of the sectional nut together; Fig. 10 is a section on the line 10—10 of Fig. 7 looking in the direction of the arrows; and Fig. 11 is a view of the ferrule end of the staff, partly in central vertical section.

The invention in its preferred embodiment includes a staff composed of an outer tubular member 1 within which telescopes an inner tubular member 2, the lower end of the tubular member 1 being secured in any suitable manner to the usual handle 3, and its upper end is of contracted diameter, as clearly shown in Fig. 2, to closely fit the member 2, the latter being of such diameter as to leave an annular space between it and the bore of the member 1. The lower or inner end of the tubular member 2 has secured therein in any suitable manner a pin or shaft 4 constructed with a collar 5 which provides it with a shoulder against which the tubular member 2 abuts, the diameter of said collar being such as to snugly fit the bore of the member 1, thereby giving a bearing to the member 2 at two points. The pin 4 is extended beyond the collar 5, where it is of conical form and in threaded engagement with a sectional nut 6, said nut being preferably made in two halves, with a counter-bored portion at the lower end, which receives a spring clip 7 shown in detail in Fig. 9, the arms of said clip being each secured to one-half of the nut and serving the double purpose of keeping the sections of the nut in proper relative position and preventing the same from turning with the threaded end of the pin 4 when the handle of the umbrella is revolved to expand the nut in diameter. After the pin and nut have been assembled, the lower extended end is riveted over, as indicated at 8, to prevent the complete separation of these parts should the pin be entirely screwed from the nut.

The top extremity of the inner tubular member 2 of the staff is threaded to detachably receive a ferrule 9 shown in detail in Fig. 11, and has fixed adjacent thereto the usual crown or collar 10, between which the ribs are pivotally attached, each rib in the present construction consisting of an inner and an outer section 11 and 12 respectively, which are slidably connected together with the outer section fitting within the inner section. Both the sections of each rib are made U-shaped in cross section, the inner-section 11 being constructed from a sheet metal blank 11$^a$ shown in detail in Fig. 5. The end of this blank which forms that end of the rib section connecting the outer section 12, is provided with tabs 13$^a$ and projections 14$^a$, said tabs and projections being arranged at the opposite sides of the blank with the projections at the inside of the tabs. At one side of the blank the tab and projection are of diminished length, the metal being utilized to form an extended tongue 15$^a$ which is attached to this tab at one corner only. In shaping the blank 11$^a$ to form the rib 11, it is bent U-shaped longitudinally and the tabs 13ª and projections 14ª are inwardly-turned to bridge the top of the rib, the latter forming, respectively, a keeper 13 and a stop 14, as shown in Fig. 6. The tongue 15ª is folded on top of the keeper 13 and is shaped to provide a spring catch 15, the extreme end of which passes underneath the stop 14.

The outer section 12 of each rib is constructed from a blank 12ª shown in Fig. 4, and is provided at its inner end with tabs 16ª, projections 17ª and projections 18ª, all of which are arranged at both sides of the blank with the tabs located intermediate the projections. In shaping the blank 12ª to form the rib 12, as shown in Fig. 3, as it is bent into U-shape longitudinally, the tabs 16ª are folded at the outside to provide flanges 16, the projections 17ª being turned upwardly and spaced apart a slight distance to provide ears 17 and the projections 18ª are turned toward each other to bridge the space in the rib and provide a keeper 18.

In assembling the sections of the ribs, the outer sections 12 are telescoped within the inner sections 11 with the flanges 16 of the outer sections embracing the exterior of the inner sections and the keepers 13 of the inner sections engaging the top edges of the outer sections. It is apparent from this construction and arrangement that when the ribs are extended by separating the outer and inner sections, the stop 14 will contact with the keeper 18 as the catch 15 engages with the latter and thus prevent the further relative movement of the sections and lock them securely together.

Between the ears 17 of each of the outer rib sections 12 is pivotally attached a stretcher 19, the inner end of which is pivoted to a runner 20 slidable upon the umbrella staff, and is provided with a spring-pressed catch 21 adapted to engage in openings formed in the members 1 and 2, suitably arranged to retain the umbrella in outstretched and in folded position.

Assuming the umbrella to be folded as shown in Fig. 2, it is extended by grasping the handle 3 with the right hand and the upper end or tubular member 2 of the staff with the left, and separating them until the collar 5 contacts with the contracted portion of the tubular member 1. By now giving the handle 3 a few turns relatively to the tubular member 2 of the staff in a direction to thread the pin 4 within the sectional nut 6, the latter is expanded and positively clamps the two members of the staff together. The runner 20 is then drawn down, which acts to slide the outer sections 12 of the ribs outwardly and extend the same until the catches 15 automatically engage with the keepers 18. The umbrella can then be raised in the ordinary manner.

In folding the umbrella after it is lowered the runner is drawn down as far as possible with one hand and the other hand is grasped about the ribs at the joints, the pressure applied operating to disengage the catches 15 from the keepers 18. On now forcing up the runner, the rib sections are telescoped one within the other. The handle of the umbrella should then be turned to unscrew the pin 4 from the sectional nut 6, after which the tubular members of the staff may be pushed together and secured in this position, if desired, by revolving the handle to again thread the pin 4 within the sectional nut. The length of the staff may be further contracted, if desired, by unscrewing the ferrule 9.

The invention as shown and described, although being the preferred practical embodiment of my improved umbrella, is nevertheless susceptible of numerous modifications falling within the scope of the annexed claims.

Having thus described my invention I claim as new and desire to secure by Letters Patent:

1. In a folding umbrella, a staff composed of a plurality of telescoping tubular members, a nut carried by one of said members comprising a plurality of sections and adapted to be expanded to clamp said members together, and a resilient device for holding said sections against rotation relative to the tubular member in which they are located.

2. In a folding umbrella, a staff composed of an outer tubular member with an inner tubular member telescoped therein, a nut composed of a plurality of sections slidable within the outer member, a conically-threaded device carried by the inner tubular member adapted to be threaded into the sections of the nut, and a resilient device for forcing said sections of the nut into substantial contact with the outer tubular member, for the purpose described.

3. In a folding umbrella, a rib composed of two sections, each section being U-shaped in cross section, and one of said sections being formed with a keeper and outwardly turned flanges embracing the other section, and the other section being formed with a stop, a keeper for engaging the edges of the first-named section, and a spring catch passing under the stop, adapted to engage with said keeper and lock said sections together when the rib is extended.

4. An umbrella rib composed of an inner and outer section substantially U-shaped in cross-section and telescoped one within the other, the inner section of said rib having a spring catch at its outer free end and provided with a keeper for engaging said catch and the edges of the outer rib section, and the outer section of the rib having outwardly-turned flanges in embrace with the outside of the inner rib section and provided with a keeper adapted to engage said catch when the rib sections are extended.

5. An umbrella rib composed of two sections telescoped one within the other, one of said sections having a spring catch and provided with an adjacent keeper for engaging the edges of the other section, and the other section having outwardly-turned flanges in embrace with the first-named section and provided with an adjacent keeper adapted to engage with said spring catch when the rib sections are extended.

6. In a folding umbrella, a rib section substantially U-shaped in cross-section having flanges turned outwardly to substantially conform to the outside thereof and spaced therefrom and provided with a keeper bridging the space thereacross adjacent to said flanges and a second rib section embraced by said flanges and having means to engage with said keeper and lock the rib sections together.

7. In a folding umbrella, a rib section substantially U-shaped in cross section and having a spring catch arranged over the open portion thereof and provided with a keeper bridging the space thereacross over said spring catch and a second rib section having means adapted to be engaged by said catch and lock the rib sections together.

In testimony whereof I have signed my name to this specification in the presence of two subscribing witnesses.

WILLIAM THEDORF.

Witnesses:
 ELMER CAMERON,
 WILLIAM G. DEACON.